June 8, 1926.
G. E. WISWELL
1,587,740
SUPPORT FOR PLANTS AND BUSHES
Filed Feb. 27, 1925
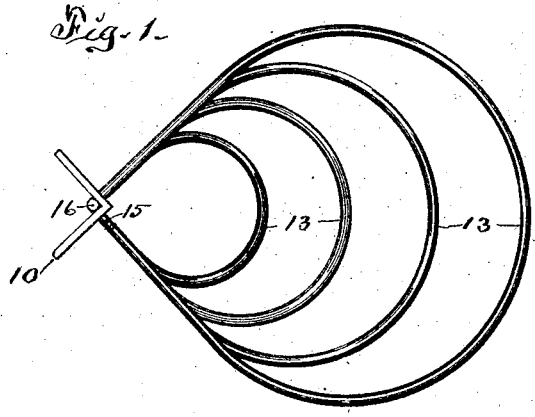
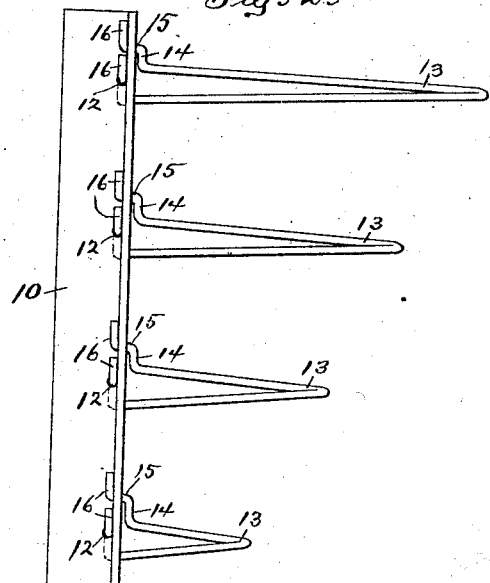
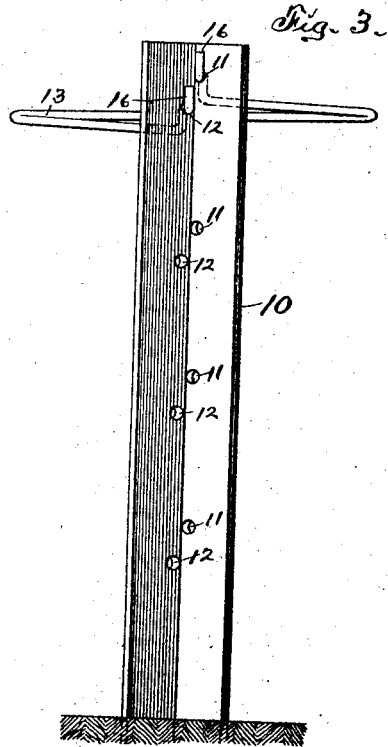
INVENTOR
George E. Wiswell
BY
ATTORNEY Patented June 8, 1926.

1,587,740

UNITED STATES PATENT OFFICE.

GEORGE E. WISWELL, OF NEW SHARON, IOWA.

SUPPORT FOR PLANTS AND BUSHES.

Application filed February 27, 1925. Serial No. 11,949.

An object of this invention is to provide improved means for supporting plants, bushes or shrubbery while growing or bearing fruit.

A further object of this invention is to provide an improved construction for an adjustable support adapted to receive and guide and carry a plant, such as tomato, during the growing season thereof and keep the branches and fruit thereof off the ground.

My invention consists in the construction, arrangement and combination of elements hereinafter set forth, pointed out in the claims and illustrated by the accompanying drawing, in which—

Figure 1 is a plan of my improved device. Figure 2 is a side elevation of the same. Figure 3 is an elevation of the same at an angle to Figure 2.

In the construction of the device as shown the numeral 10 designates a post preferably made of angle-bar of any desired size. A plurality of pairs of holes 11, 12 are formed in the bar or post adjacent to the inner angle thereof, the holes of each pair being at right angles to each other and spaced altitudinally of the post, the pairs of holes also being spaced apart. A plurality of loops 13 are provided, each loop being preferably made of round wire, substantially circular in plan, the end portions of the circular portion of the loop being in different planes and upturned. The upturned portions of the loop are offset laterally substantially midway of their length to form a stem 14, a rest 15 and a prong 16 on each, the rests extending laterally at right angles to each other and the prongs alining substantially perpendicular to the loop, while the stems occupy parallel planes. The loops are of graduated sizes and are mounted on the post with the smallest loop at the bottom and the largest loop at the top. Each loop is secured, detachably, to the post 10 by passing the prongs 16 through holes 11, 12 of a pair and introducing the rests 15 to said holes; the loop being substantially parallel with the post during the insertion of the prongs and then being moved into a plane transversely of the post for the insertion of the rests; said loop being supported in the latter position by engagement of the stems with the outer faces of the post and by engagement of the prongs with the inner faces of the post. The loops may be removed from the post by opposite movement thereof.

In use, the smallest loop is first employed, being mounted on the post near the surface of the ground, surrounding a small growing plant or shrub. As the plant or shrub increases in height and develops a tendency to bend or droop, another loop is passed around it and secured to the post at greater altitude than the first. Successive loops are added from time to time to support and protect the plant or shrub. In some instances all the loops may be applied at the beginning to support and protect a relatively tall object.

I claim as my invention—

A supporting device, comprising an angle-bar post formed with spaced holes at right angles to each other and arranged in pairs spaced altitudinally, the holes of each pair being in different altitudes; and loops formed with end portions adapted to be received in any pair of said holes selectively, said loops extending transversely of said post.

GEORGE E. WISWELL.